Dec. 20, 1932.                    E. CONTI                    1,891,749
              APPARATUS FOR TRIMMING DRINKING STRAWS
                    Filed April 24, 1930      5 Sheets-Sheet 1

Dec. 20, 1932.  E. CONTI  1,891,749
APPARATUS FOR TRIMMING DRINKING STRAWS
Filed April 24, 1930  5 Sheets-Sheet 2

INVENTOR
Eugene Conti
BY
Emery, Booth, Varney & Whittemore
ATTORNEYS

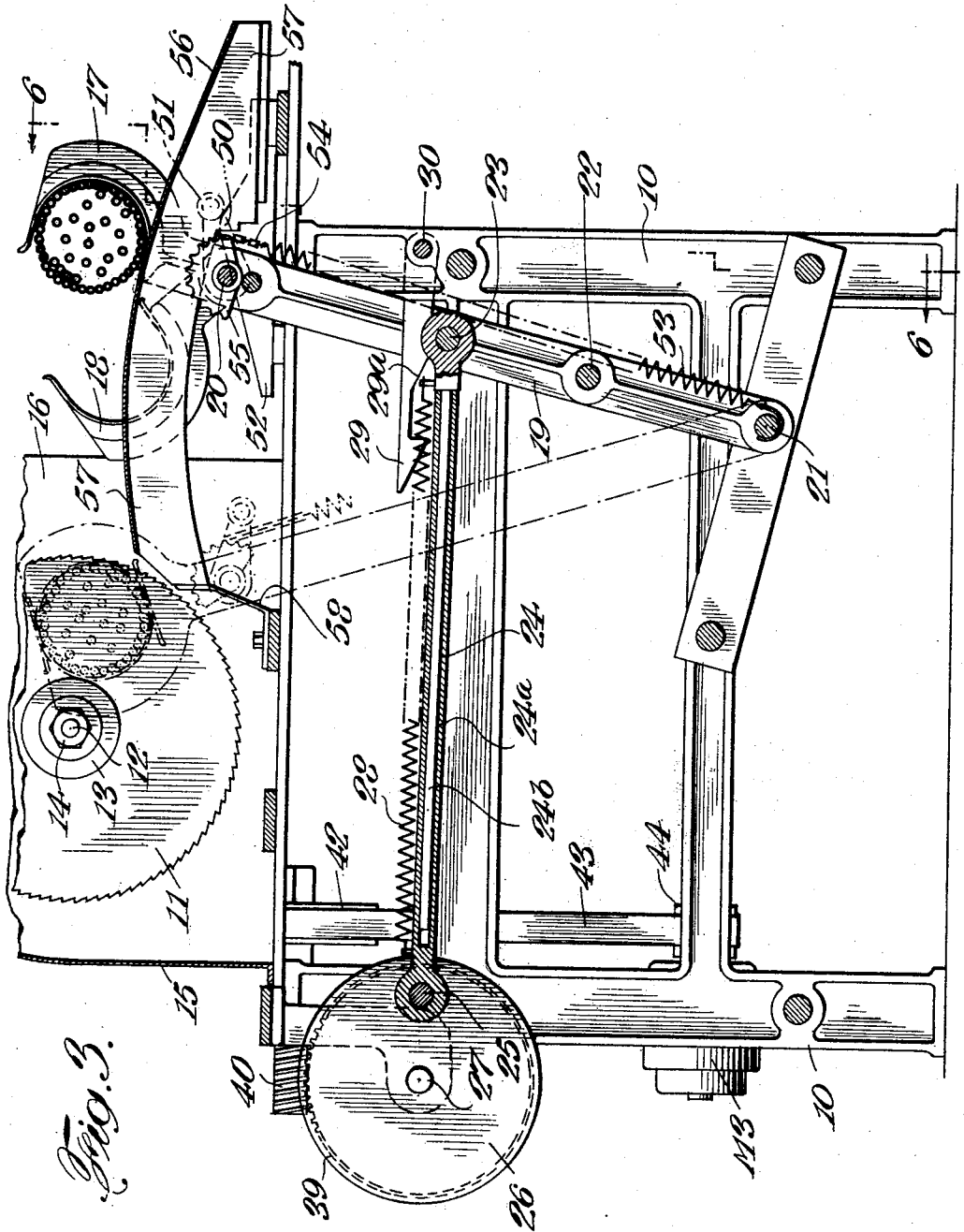

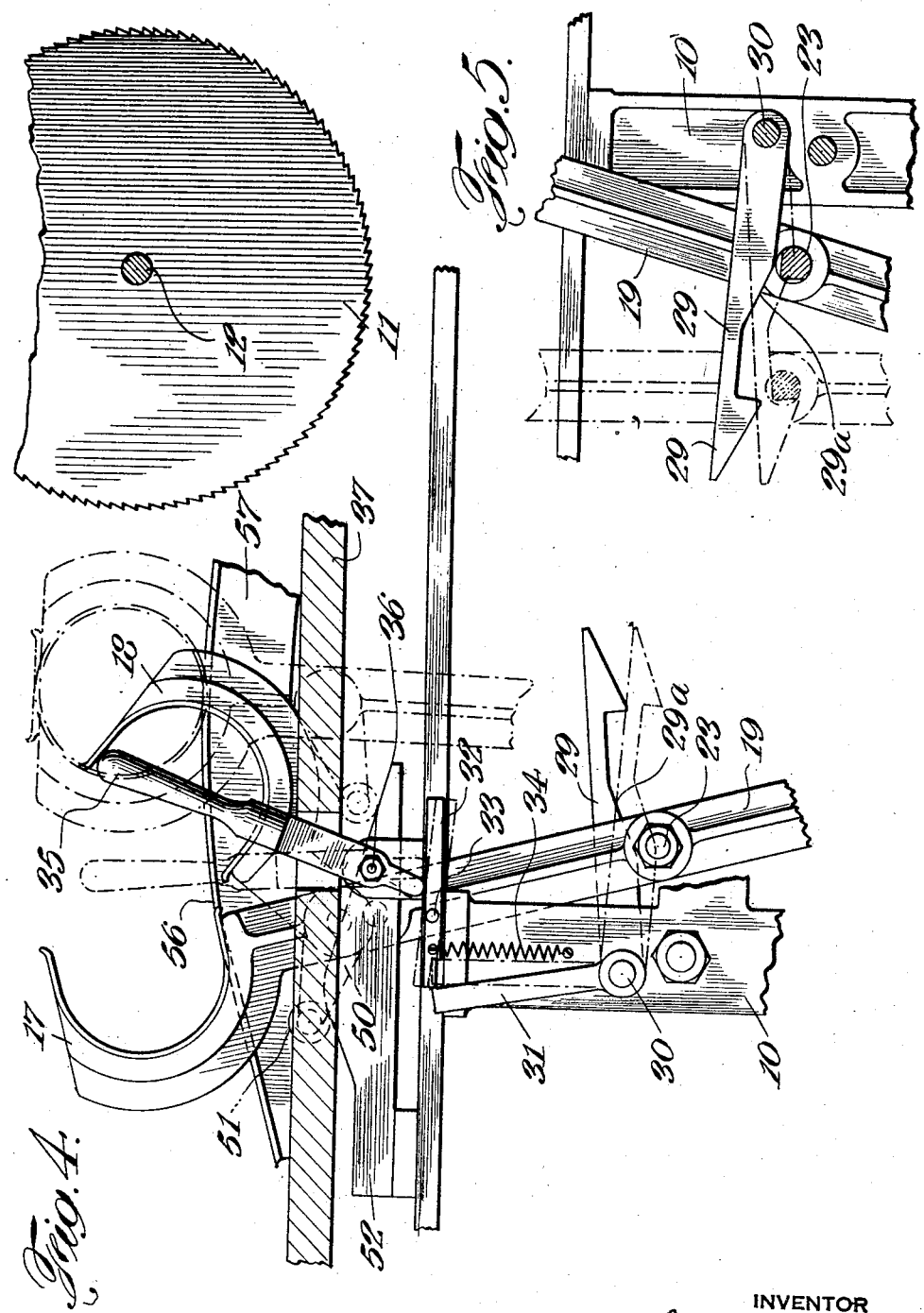

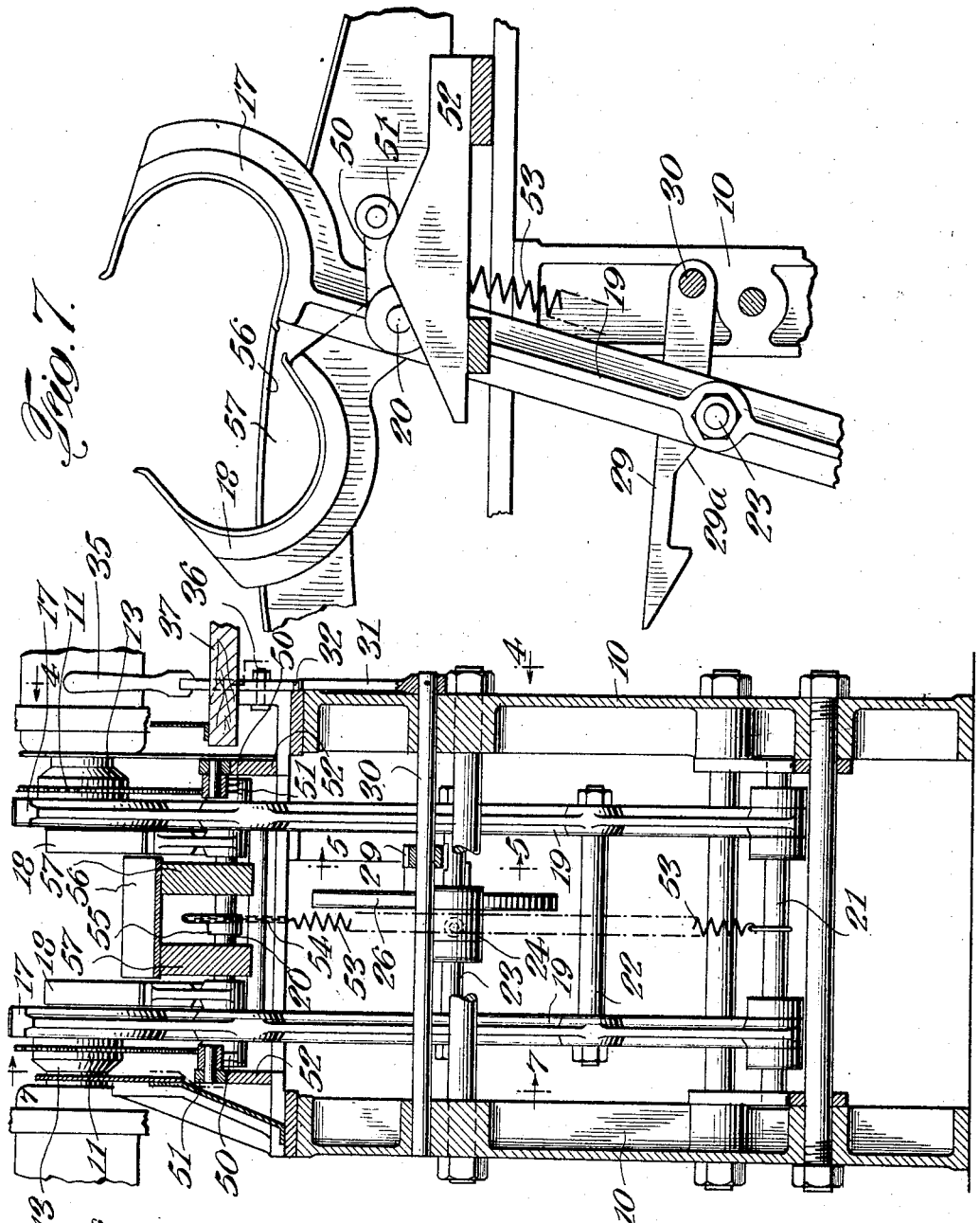

Patented Dec. 20, 1932

1,891,749

UNITED STATES PATENT OFFICE

EUGENE CONTI, OF MOUNT VERNON, NEW YORK, ASSIGNOR TO ALEXANDER HERZ, OF NEW ROCHELLE, NEW YORK

APPARATUS FOR TRIMMING DRINKING STRAWS

Application filed April 24, 1930. Serial No. 446,891.

This invention relates to apparatus for trimming drinking straws or the like and has for an object the provision of improvements in this art.

Further objects and various features of novelty of the invention will be apparent from the following description of a preferred illustrative embodiment thereof shown in the accompanying drawings, in which:

Fig. 3 is a vertical section taken on the line 3—3 of Fig. 1;

Fig. 4 is a partial vertical section taken on the line 4—4 of Fig. 6;

Fig. 5 is a partial vertical section taken on the line 5—5 of Fig. 6;

Fig. 6 is a transverse vertical section taken on the line 6—6 of Fig. 3; and

Fig. 7 is a partial vertical section taken on the line 7—7 of Fig. 6.

Figure 1:
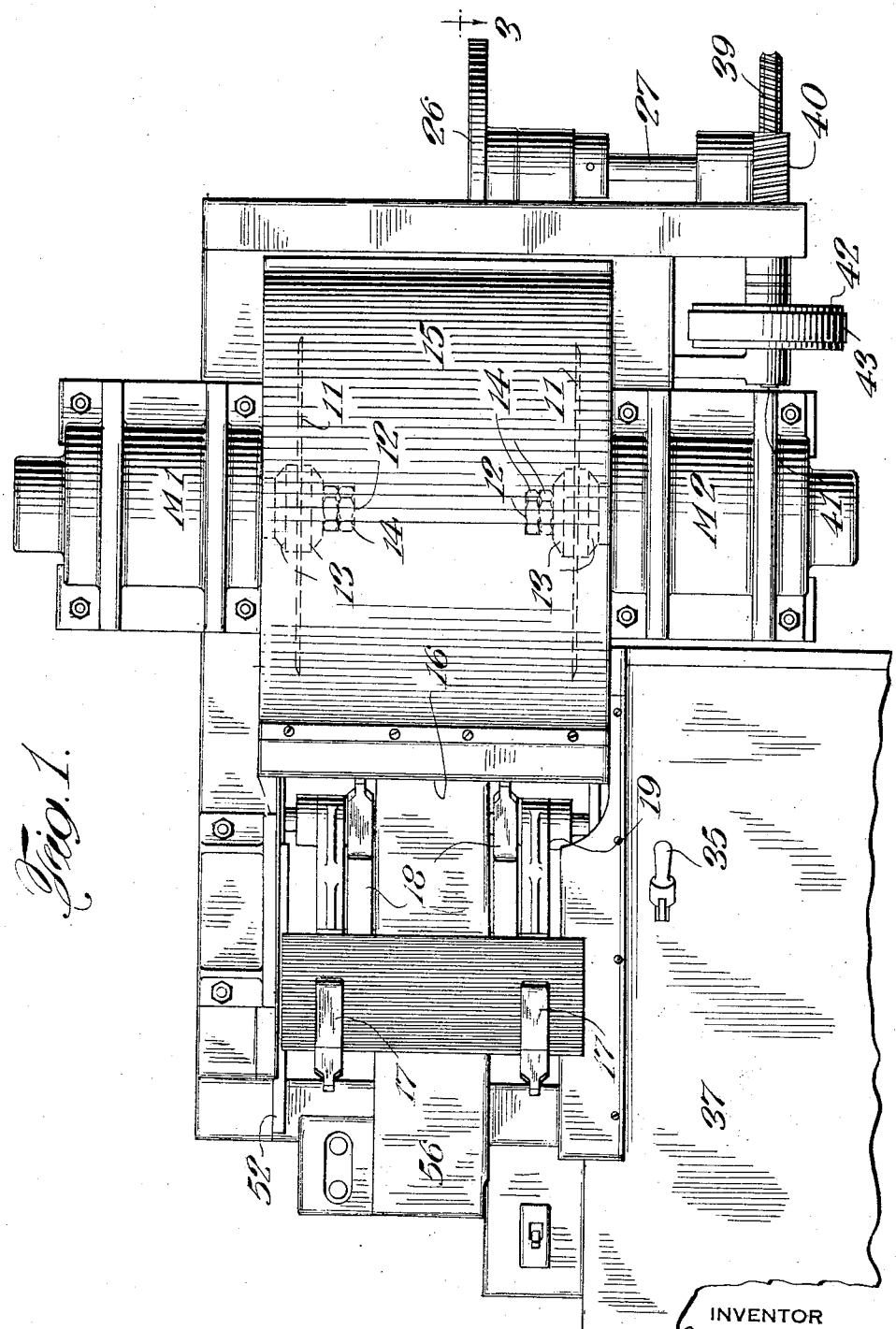
Fig. 1 is a top plan view of apparatus embodying the invention.

The apparatus is designed to grasp a bundle of drinking straws, present it while so grasped to cut-off saws which sever the straws, and move the bundle while still grasped to a given position where the bundle is released for removal.

In the particular embodiment of the invention selected for purposes of illustration and shown in the drawings, a main frame 10 supports the operating parts. In the present machine there are two cut-off saws 11 operated by separate motors M1, M2. The bundle conveying mechanism is operated by a third motor M3.

The use of separate motors for separate working parts of the machine is advantageous because it permits independent action of the parts; avoids complicated shafting and gearing which makes the machine neater in appearance, freer from trouble and less likely to injure the operator; and moreover, it is more economical to install and operate several small motors in this way than one large motor. It permits the saws 11 to be mounted upon axially spaced shafts 12 providing easy access to the saws for axial adjustment thereof relative to each other.

The axial adjustment may be accomplished in any approved manner, for example, by varying the thickness of the holding collars 13 or the use of shims. The saws are retained by lock nuts 14.

Figure 2:
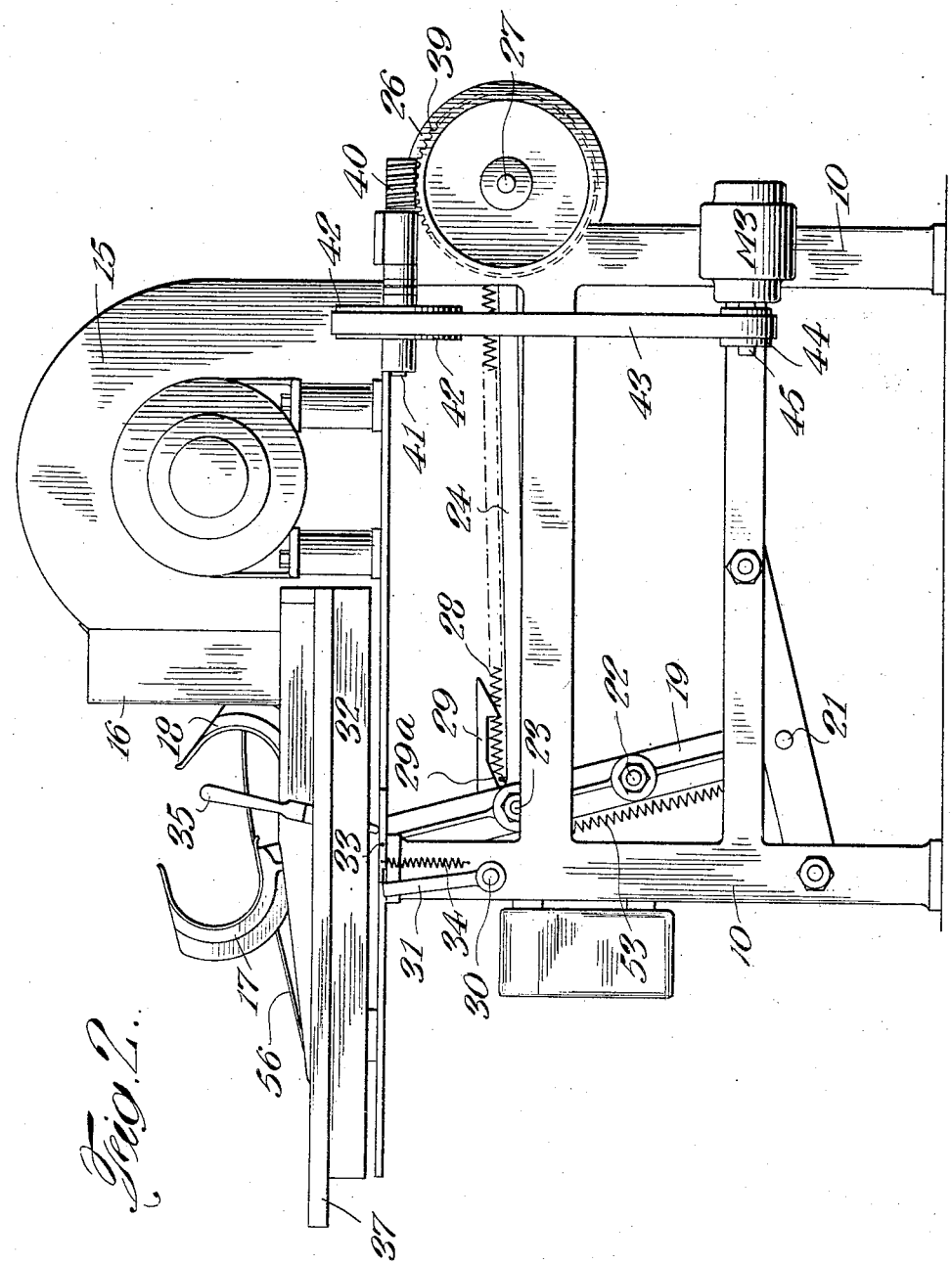
Fig. 2 is a right side elevation.

Preferably the saws are disposed directly opposite each other so as to mutually resist longitudinal shifting of the straws. The saws may be enclosed by a guard 15 (Fig. 2) having an opening 16 for movement of the bundles.

The bundle conveying mechanism includes (Figs. 3 and 6) jaws 17 and 18, one of each pair of which 17 is fixed as by being carried rigidly by the swing frame 19 and the other 18 being swingably mounted relative to the fixed jaws. The jaws 18 may be mounted upon a cross shaft 20 of the frame 19.

The frame 19 is mounted upon a rock shaft 21 secured to the main frame 10. The parts of the frame 19 are spaced by tie rods 22, 23, the latter being employed as a drive connection for the pitman rod 24 whereby the frame is swung when the crank pin 25 on crank disc 26 is turned about the crank shaft 27. The pitman rod 24 is telescopic, comprising the barrel 24a and pin 24b connected together by the spring 28. Thus if the swinging frame is held against forward movement the crank pin may continue its movement without causing damage.

The holding is accomplished by a latch 29 rigidly mounted upon a latch rod 30. Referring to Fig. 4, the latch rod 30 also carries rigid therewith the arm 31, the upper end of which is associated with a spring biased lock lever 32 pivoted upon the pin 33. The spring 34 normally holds the end of the lock lever in front of the arm 31 to hold the latch above the shaft 23 so that the frame may swing freely; but a hand lever 35 pivoted upon pin 36 below table 37 is provided for holding down the other end of the lock lever to throw the latch down where it will catch the shaft 23 and prevent movement of the frame beyond the position shown in chain lines in Fig. 4. If desired the frame may be held by hand in the extreme outward position.

A cam surface 29a on the latch 29 is engaged by the shaft 23 to throw the arm 31 back at each stroke so the lock lever 32 may drop down in front thereof.

The crank shaft 27 is driven (Fig. 1) through a worm gear 39 fast thereon by a worm 40 on a shaft 41, the shaft 41 having a pulley 42 (Fig. 2) driven by a belt 43 from a pulley 44 on the shaft 45 of the motor M3.

Referring to Fig. 6 it is seen that the movable jaws 18 are mounted to swing alongside the fixed jaws 17, thus adapting them for holding various sized bundles. The jaws 18 are rigid with the shaft 20 which at its outer ends also carries rigid therewith (see also Fig. 7) the cam arms 50 having cam rollers 51 operating upon the fixed cams 52. This causes the jaws 18 to swing open for removal of a trimmed bundle and the introduction of a new untrimmed bundle each time the frame 19 swings away from the saws. A spring 53 connected at its lower end to the cross shaft 21 and at its upper end to a chain 54 wound about a sprocket 55 fast on the shaft 20 causes the jaws normally to remain closed.

An apron 56 (Figs. 3 and 6) supported by bars 57 and at its front end by brackets 58 serves as a guard over operating parts and as a support for bundles before they are clamped by the jaws.

The operation of the apparatus will be apparent from the above description without further narration. It will also be understood that the invention is not limited to the illustrative embodiment but only by the prior art and the scope of the subjoined claims.

What I claim is:

1. Apparatus for trimming drinking straws, comprising in combination, fixed and movable bundle gripping jaws mounted upon a swinging frame, an apron disposed where it will support bundles in said jaws before and after engagement, resilient driving means for swinging said frame, said driving means including a telescopic spring-joined pitman rod, a latch controlled manually for limiting the movement of said frame in feeding direction, and spaced saws on axially spaced shafts at each side of the path of the swing frame for severing the bundles of straws when fed thereto.

2. Apparatus for trimming drinking straws, comprising in combination, means for gripping a bundle of straws, a swingable frame carrying said means, a saw positioned in the path of said bundles for severing them, and resilient means for swinging said frame.

3. Apparatus for trimming drinking straws, comprising in combination, jaws for gripping a bundle of straws, a swingable frame carrying said jaws, a fixed cam in the path of movement of said frame for opening said jaws when the frame is in outward position, and saws disposed in the path of said bundles for severing them when the frame is in inward position.

4. Apparatus for trimming drinking straws, comprising in combination, a swingable frame for conveying bundles of straws to cut-off saws disposed in the path of said bundles, a latch rod on said frame, a hook latch for engaging said rod to hold said frame, a lock arm on said latch, a lock lever adapted to have its end swung in front of said arm to hold said latch in inoperative position, and a cam on said latch engaged by said latch rod for regularly moving said arm away from the end of said lock lever.

5. Apparatus as set forth in claim 4 in which a spring tends to keep the end of said lock lever in front of said lock arm and in which a manual control lever is adapted by a cam action to hold the end of said lock lever above the end of said lock arm.

6. Apparatus for trimming drinking straws, comprising in combination, a straw holding device, a straw cutting device positioned in the path of said straws and yieldable means for periodically moving one of said devices toward the other for cutting the straws, whereby the devices may be held apart when desired in spite of the moving means.

7. Apparatus for trimming drinking straws, comprising in combination, means for gripping a bundle of straws, means positioned in the path of the bundle for cutting it, a continuously acting driving device, and a resilient expansible connecting device attached to said driving device and to one of said means for moving it toward the other said means for severing the straws.

8. Apparatus for trimming drinking straws, comprising in combination, means for gripping a bundle of straws, means for cutting the bundle positioned in the path thereof, a continuously acting driving device, a resilient expansible connecting device attached to said driving device and to one of said means for moving it toward the other said means for severing the straws, and means for automatically opening the gripping means when said gripping and severing means are in their distal relationship.

In testimony whereof, I have signed my name to this specification this 23rd day of April, 1930.

EUGENE CONTI.